United States Patent
Leitch et al.

(10) Patent No.: US 9,584,447 B2
(45) Date of Patent: Feb. 28, 2017

(54) APPARATUS AND METHOD FOR CLIENT-SIDE FLOW CONTROL IN A REMOTE ACCESS ENVIRONMENT

(71) Applicant: Calgary Scientific Inc., Calgary (CA)

(72) Inventors: Sam Anthony Leitch, Sammamish, WA (US); Kevin Glen Robinson, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 279 days.

(21) Appl. No.: 14/534,262

(22) Filed: Nov. 6, 2014

(65) Prior Publication Data

US 2015/0127761 A1    May 7, 2015

Related U.S. Application Data

(60) Provisional application No. 61/900,940, filed on Nov. 6, 2013, provisional application No. 61/910,189, filed on Nov. 29, 2013.

(51) Int. Cl.
*G06F 15/173*   (2006.01)
*H04L 12/58*   (2006.01)
(Continued)

(52) U.S. Cl.
CPC ............ *H04L 51/02* (2013.01); *H04L 47/10* (2013.01); *H04L 47/266* (2013.01); *H04L 47/27* (2013.01); *H04L 47/34* (2013.01); *H04L 47/522* (2013.01)

(58) Field of Classification Search
USPC ............ 709/209, 227, 223, 236, 218, 219
See application file for complete search history.

(56) References Cited

U.S. PATENT DOCUMENTS 6,314,452 B1  11/2001  Dekel et al.
6,377,257 B1   4/2002  Borrel et al.
(Continued)

FOREIGN PATENT DOCUMENTS

DE  102010043783  11/2011
EP      1667017   6/2006
(Continued)

OTHER PUBLICATIONS

Engel, K., et al., "Combining Local and Remote Visualization Techniques for Interactive Volume Rendering in Medical Applications," Proceedings Visualization, 2000, 5 pages.
(Continued)

*Primary Examiner* — Jude Jean Gilles
(74) *Attorney, Agent, or Firm* — Meunier Carlin & Curfman LLC

(57) ABSTRACT

A client-side flow control mechanism for controlling the flow of messages communicated from a service to a client in a remote access system. The service, which may be a managed or unmanaged service, may communicate messages to the client where the messages include a service sequence ID (SSI). As the client processes the messages from the service, the client responds with a client sequence ID (CSI). The SSI and CSI values determine the number of messages that are in transmission queues. The service compares a difference between the current SSI and CSI to a stop window value. If the difference is greater than the stop window value, transmission of messages from the service to the client is turned OFF. The client continues to send CSI acknowledgments as it processes messages. Once the difference falls below a start window value, the transmission of messages to the client is turned ON.

22 Claims, 5 Drawing Sheets

(51) Int. Cl.
*H04L 12/801* (2013.01)
*H04L 12/825* (2013.01)
*H04L 12/873* (2013.01)
*H04L 12/807* (2013.01)

(56) References Cited

U.S. PATENT DOCUMENTS

| | | |
|---|---|---|
| 6,384,821 B1 | 5/2002 | Borrel et al. |
| 7,483,939 B2 | 1/2009 | Mussack et al. |
| 7,502,860 B1 * | 3/2009 | Champagne ............ H04L 47/10 370/252 |
| 7,890,573 B2 | 2/2011 | Turner et al. |
| 7,925,100 B2 | 4/2011 | Howell et al. |
| 7,991,837 B1 | 8/2011 | Tahan |
| 8,253,732 B2 | 8/2012 | Hamill et al. |
| 8,386,560 B2 | 2/2013 | Ma et al. |
| 8,438,254 B2 * | 5/2013 | Hopen ................ H04L 67/1008 709/223 |
| 2002/0085488 A1 * | 7/2002 | Kobayashi ............ H04L 47/193 370/216 |
| 2004/0075671 A1 | 4/2004 | Vale et al. |
| 2004/0117117 A1 | 6/2004 | Sohl et al. |
| 2004/0189677 A1 | 9/2004 | Amann et al. |
| 2005/0132030 A1 * | 6/2005 | Hopen ................ H04L 67/1008 709/223 |
| 2007/0046966 A1 | 3/2007 | Mussack et al. |
| 2007/0115282 A1 | 5/2007 | Turner et al. |
| 2007/0147686 A1 | 6/2007 | Joshi |
| 2007/0223310 A1 | 9/2007 | Tran |
| 2007/0277115 A1 | 11/2007 | Glinsky et al. |
| 2009/0138544 A1 | 5/2009 | Wegenkittl et al. |
| 2009/0210487 A1 | 8/2009 | Westerhoff et al. |
| 2009/0222573 A1 | 9/2009 | Grossner et al. |
| 2010/0063992 A1 | 3/2010 | Ma et al. |
| 2010/0321381 A1 | 12/2010 | Lee et al. |
| 2011/0010629 A1 | 1/2011 | Castro et al. |
| 2012/0069036 A1 | 3/2012 | Dharmapurikar |
| 2012/0084350 A1 | 4/2012 | Xie |
| 2012/0096524 A1 | 4/2012 | Kovalan |
| 2012/0212405 A1 | 8/2012 | Newhouse et al. |
| 2012/0215838 A1 | 8/2012 | Dominick et al. |
| 2012/0303697 A1 | 11/2012 | Alstad |
| 2012/0303738 A1 | 11/2012 | Gilson |
| 2013/0135344 A1 | 5/2013 | Stirbu et al. |
| 2013/0147819 A1 | 6/2013 | Dharmapurikar |
| 2014/0192043 A1 | 7/2014 | Lehrer |
| 2014/0274138 A1 | 9/2014 | Chao et al. |

FOREIGN PATENT DOCUMENTS

| | | |
|---|---|---|
| WO | 2006/058343 | 6/2006 |
| WO | 2012/097178 | 7/2012 |
| WO | 2014/037817 | 3/2014 |
| WO | 2015/036872 | 3/2015 |

OTHER PUBLICATIONS

Extended European Search Report, dated Mar. 21, 2016, received in connection with European Application No. 13834626.7.
International Preliminary Report on Patentability and Written Opinion, dated Mar. 10, 2015, received in connection with International Application No. PCT/IB2013/002690.
International Search Report and Written Opinion, dated Mar. 9, 2015, received in connection with International Application No. PCT/IB2014/002671.
International Search Report and Written Opinion, dated Feb. 27, 2015, received in connection with International Application No. PCT/US2014/064242.
Bustamante, M.L., Learning WCF, Chapter 6: Reliability, O'Reilly Media, 2007, pp. 336-405.
International Search Report and Written Opinion, dated Apr. 10, 2014, received in connection with International Application No. PCT/IB2013/002690.

* cited by examiner

APPARATUS AND METHOD FOR CLIENT-SIDE FLOW CONTROL IN A REMOTE ACCESS ENVIRONMENT

CROSS-REFERENCE TO RELATED APPLICATION

This application claims priority to U.S. Provisional Patent Application Nos. 61/900,940, filed Nov. 6, 2013, entitled "METHOD FOR CLIENT-SIDE FLOW CONTROL IN A REMOTE ACCESS ENVIRONMENT," and 61/910,189, filed Nov. 29, 2013, entitled "METHOD FOR SERVER-SERVICE SEPARATION WITH END-TO-END FLOW CONTROL IN A CLIENT-SERVER REMOTE ACCESS ENVIRONMENT," the disclosures of which are incorporated herein by reference in their entities.

BACKGROUND

Ubiquitous remote access to services has become commonplace as a result of the growth and availability of broadband and wireless network access. As such, users are accessing services using an ever-growing variety of client devices (e.g., mobile devices, tablet computing devices, laptop/notebook/desktop computers, etc.). A remote server may communicate messages that contain data or other information between services and client devices over a variety of networks including, 3G and 4G mobile data networks, wireless networks such as WiFi and WiMax, wired networks, etc.

A problem arises when there is enough network bandwidth to send messages from the service to a connected client, but the client cannot process the messages quickly enough. For example, with some APIs, networking is push-based. As such, during periods when the client is idle or performing background tasks, additional messages may be sent and queued at the client. If too many are sent and the client cannot process them in a timely fashion, errors may occur.

SUMMARY

Disclosed herein are systems and methods for providing flow control in a remote access system. In accordance with aspects of the disclosure, the method may include communicating messages from a service to a client, the service being remotely accessed by the client and the messages including a service sequence ID (SSI); receiving, at the service, a client sequence ID (CSI) from the client in response to the client completing processing of a message having a specific SSI associated with the message; determining, at the service, a difference between a current SSI communicated to the client and the current CSI received from the client; and if the difference is greater than a predetermined stop window value, turning communication from the service to the client OFF.

In accordance with other aspects of the disclosure, a method of providing client-side flow control is described that may include communicating a message from a service to a client, the message including a first sequence number that is incremented by the service to represent a relative position of the message within a plurality of messages that are communicated from the service to the client; receiving, at the service, a response from the client indicating a completion of processing of a message having a second sequence number less than first sequence number; determining, at the service from the response, if the processing of messages at the client is lagging beyond a first predetermined value and turning communication from the service to the client OFF if the client is lagging beyond the predetermined value.

In accordance with yet other aspects of the disclosure, an apparatus for providing client-side flow control of communication of messages from a service to a client is described. The apparatus may include a remote access server having a server layer as a communications proxy for messages sent between the client and the service, the server layer containing an outbound client queue of messages destined for the client; and a second server executing a service layer associated with the service, the service layer having a service receive queue for messages received from the client and a service send queue of messages destined for the client. The messages destined for the client may include a service sequence ID (SSI) and the messages received from the client include a client sequence ID (CSI) indicative of the client completing processing of a message having a specific SSI associated with the message. The service may determines if a difference between a current SSI and the CSI received from the client is greater than a predetermined stop window value to turn communication from the service to the client OFF.

In accordance with an aspect of the disclosure, a method of providing client-side flow control in a remote access system is described. The method may include communicating messages from a service to a client, the service being remotely accessed by the client and the messages including a service sequence ID (SSI); receiving a client sequence ID (CSI) from the client in response to the client completing processing of a message having an SSI associated with the CSI; determining, at the service, a difference between a current SSI communicated to the client and the CSI received from the client; and if the difference is greater than a predetermined stop window value, turning communication from the service to the client OFF.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

While implementations will be described for remotely accessing services, it will become evident to those skilled in the art that the implementations are not limited thereto, but are applicable for remotely accessing any type of service, including applications and data, via a remote device.

Figure 1:
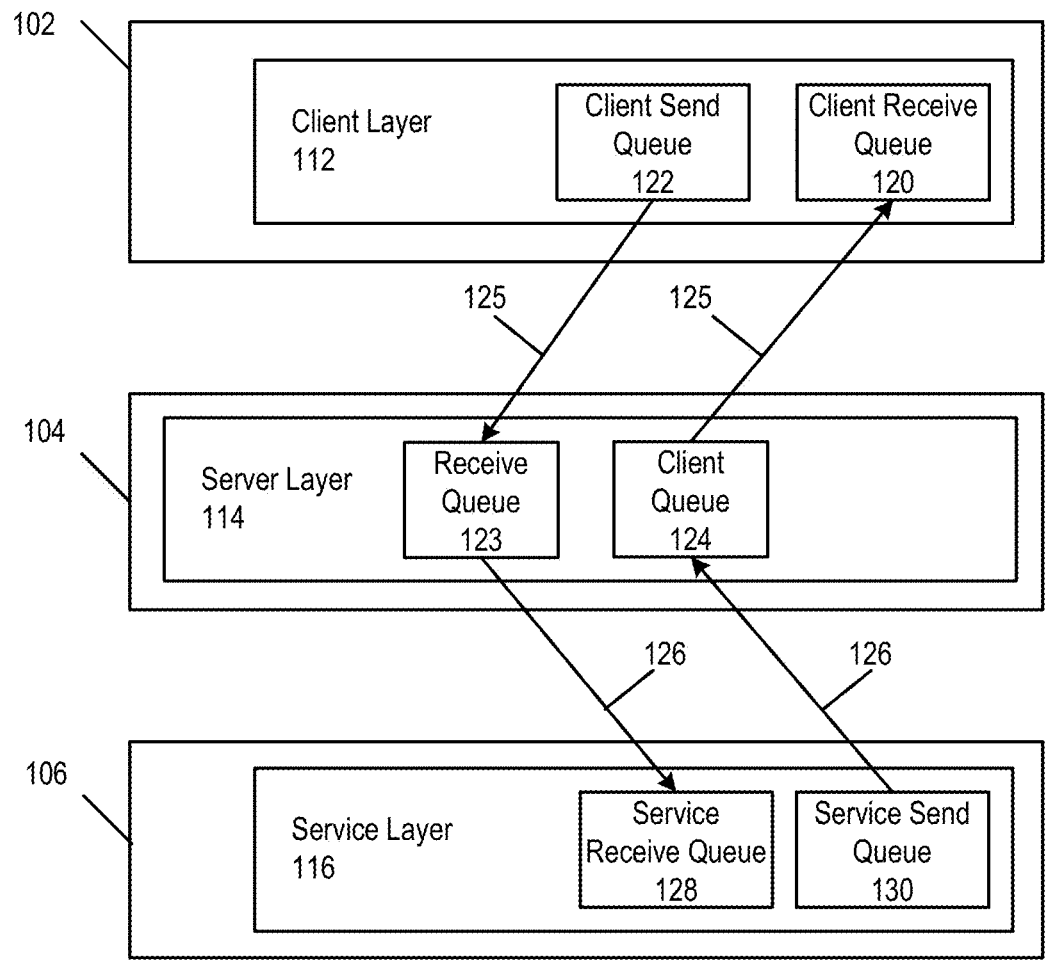
FIG. 1 illustrates an example layered architecture in accordance with the present disclosure.

With the above overview as an introduction, reference is now made to FIG. 1, which illustrates a layered architecture in accordance with the present disclosure. The layered architecture implements a client flow control mechanism which allows a client 102 to control the flow of information from a service executing on an application server 106 through a remote access server 104. As illustrated in FIG. 1, there are three layers in the system: a client layer 112, a server layer 114 and a service layer 116. In accordance with the present disclosure, the layered architecture includes messaging queues that account for the particularities of client ability to process messages containing data or other information from the application server 106. The client layer 112 resides in the client 102 and is used to connect to the server layer 114. Typically, the client layer 112 includes a client application, e.g., a web browser, dedicated application, etc., used to provide a user interface at the client 102. The client 102 may be wireless handheld devices such as, for example, an IPHONE, an ANDROID-based device, a tablet device or a desktop/notebook personal computer that are connected by a communication network 125 to the remote access server 104.

The remote access server 104 may include a server remote access program that is used to connect the client 102 to the application server 106, which may be, e.g., a medical application. An example of the server remote access program is PUREWEB, available from Calgary Scientific, Inc. of Calgary, Alberta, Canada. The server remote access program may optionally provide for connection marshalling and application process management across the architecture of FIG. 1. The remote access server 104 may be connected to the application server 106 over a communication connection 126. If the application server 106 is executing on a computing device other that the remote access server 104, the communication connection 126 may be a communication network. For example, the communication connection 126 may be a TCP/IP communications network, a VPN connection, a dedicated connection, etc. If the application server 106 is executing on the same node or computer as the remote access server, the communication connection 126 may be a TCP/IP socket connection, shared memory space, shared file location, etc.

The server layer 114 serves to proxy communications from the client 102 to the service layer 116, as described below. The client layer 112 contains a client receive queue 120 of messages received from the remote access server 104, which are sent on behalf of the application server 106 to which the client 102 is logically connected. The client layer 112 also contains a client send queue 122 of messages it sends to a receive queue 123 in server layer 114 of the remote access server 104. The messages may be ultimately destined to the application server 106, for example.

An instance of the service layer 116 (e.g., associated with the service) connects to the server layer 114, which proxies communications from the application server 106 to the client 102 logically associated with that service. The service layer 116 contains a service receive queue 128 of messages it receives from the server 104 on behalf of the client 102. Each message may be labeled with the unique identifier of the client 102. The service layer 116 also contains a service send queue 130 of messages it sends to a client queue 124 in the server layer 114 of the remote access server 104. Each message in the service send queue 130 may also be labeled with the unique identifier of the client 102. Additionally details regarding types of services is provided with reference to FIGS. 4A and 4B.

The client flow control mechanism of the present disclosure may be included as part of a service Software Development Kit (SDK) implemented in the service layer 116 that causes the service to stop sending messages when the network connection between server 104 and client 102 is saturated as determined by message tracking system. As will be described below with reference to FIG. 2, a sequence counter may be added to track the current service sequence ID (SSI) sent to a client and current client sequence ID (CSI) received from the client for each connected session. The client layer 112 listens for messages from the service execution on the application server 106 that have the service sequence ID (SSI). Whenever the client receives and processes a message having an SSI, it sends the client sequence ID (CSI) as an acknowledgement to the service. Transmission to the client 102 may be turned OFF when difference between the service sequence ID (SSI) and the client sequence ID (CSI) is larger than a predetermined OffWindowSize value. In other words, the combination of the SSI and CSI indicate the number of messages in queues 120, 124 and 130 is greater than the OffWindowSize value. Transmission to the client 102 may be turned ON when the difference between the service sequence ID (SSI) the client sequence ID (CSI) is below an OnWindowSize value. As such, the service will be able to determine how far behind the client 102 is in its message processing. The OnWindowSize value allows the client to "catch up" before the service sends more data.

|  | CSI | SSI |
|---|---|---|
| Flow control message |  |  |
| Client transmit on (initially) | 0 | 0 |
| Service sends SequenceID |  |  |
| Client receives/processes | 0 | 1 |
| Acknowledgement |  |  |
| Client sends update SequenceID |  |  |
| Service receives/processes | 1 | 1 |
| If SSI-CSI > stop window size |  |  |
| Client transmit OFF |  |  |
| If SSI-CSI < Start window size |  |  |
| Client transmit ON |  |  |
| Stop window size ≥ Start window size |  |  |

Service sequence ID: SSI
Client sequence ID: CSI

Figure 2:
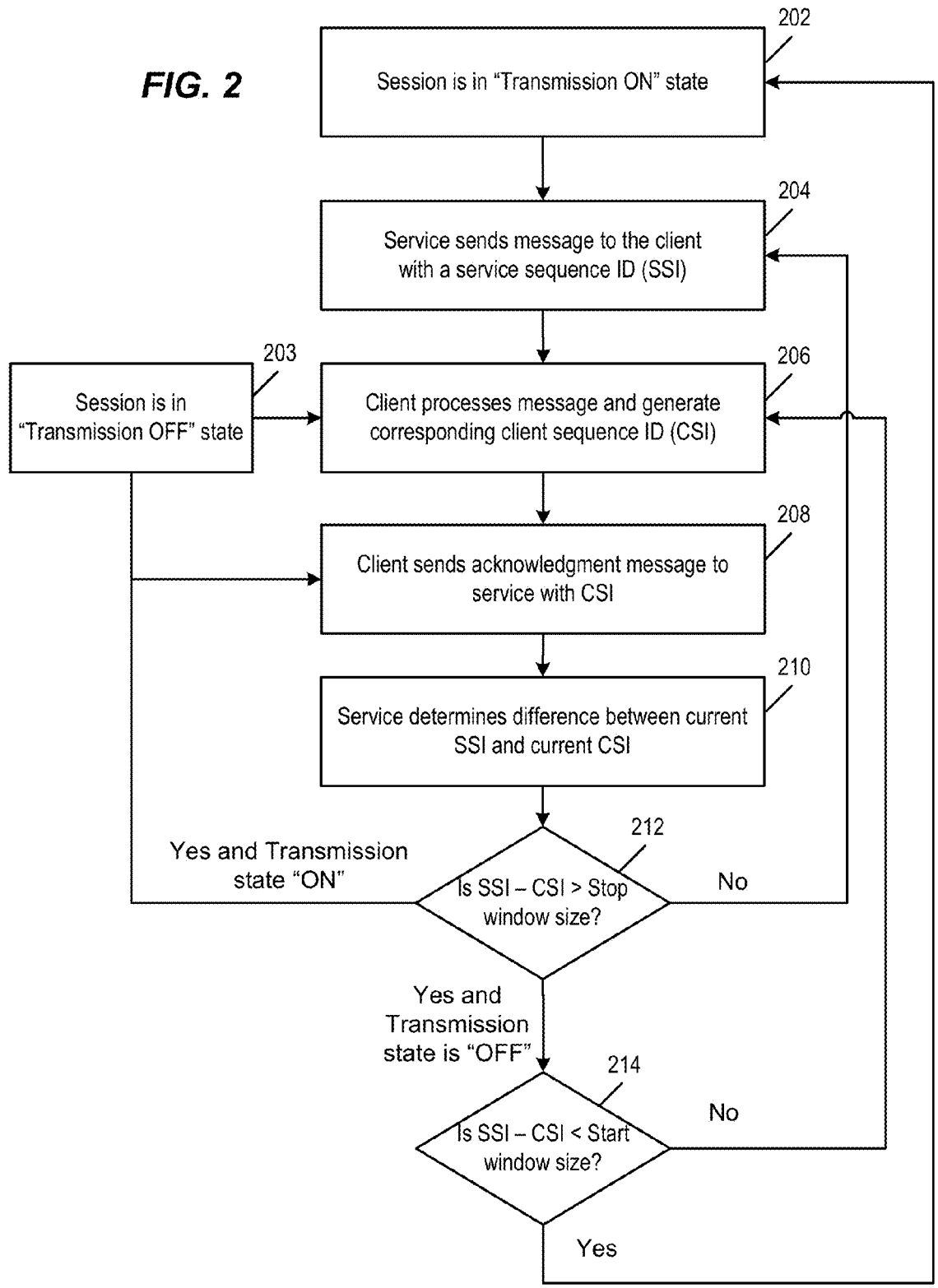
FIG. 2 illustrates a flow diagram of example operations performed within the architecture of FIG. 1.

FIG. 2 is an operational flow diagram 200 of providing client-side flow control. At 202, a session begins having its transmission state "ON." As such, communication between the client 102 and the service execution on the application server 106 is established and messages are flowing. At 204, the service sends a message to the client with the service sequence ID (SSI). The SSI is incrementing identifier sent by the application server 106. As described above, each time the service at the application server 106 sends a packet of messages to the client 102, it sends a sequence ID to client 102. At 206, the inbound message having the SSI is processed by the client and the client sequence ID (CSI) is generated. As noted above, the CSI may be a reflection of the SSI contained in the message processed by the client 102. At 208, the client sends acknowledgment message to the service with the CSI. In accordance with aspects of the present disclosure, the CSI send by the client 102 is sent after client 102 processes the message from the application server 106.

For example, if the SSI is "1," then the client 102 may reflect "1" as the CSI in the acknowledgement message to the application server 106.

At 210, the service determines the difference between the current SSI and the current CSI. The application server 106 maintains the current SSI and CSI values. A difference between these values may be used by the application server 106 to determine if the client 102 is overwhelmed or otherwise lagging behind the application server 106. At 212, if the difference between the SSI the CSI is larger than a stop window size (e.g., the OffWindowSize value) and the current state transmission state is "ON," then the session is set to an "OFF" transmission state at 203. This change of transmission state will stop the application server 106 from sending additional messages to the client 102. The application server 106 will continue to track the SSI and CSI values, because the client 102 may send messages updating the CSI as it continues to process messages. While the transmission state is OFF, messages are queued in the service send queue 130 in the service layer 116. Processing then continues at 206 where the client 102 continues process queued messages in the client receive queue 120.

If, at 212, the difference between the SSI and the CSI is not greater than the stop window size, then processing returns at 204 where the service sends a next message to the client with an incremented SSI. The application server 106 will send the next message in the service send queue 130 to the client 102. Processing continues, as described above.

If at 212, if the current transmission state is "OFF," then at 214 it is determined if the difference between the SSI and the CSI is less than a start window size (e.g., the OnWindowSize value). If not, then processing returns to 206, where the client 102 processes the next message in the client receive queue 120. If at 214 the difference between the SSI and the CSI is less than the start window size, then the client is ready to process messages from service, and the transmission state is set to "ON" at 202.

In the above operational flow, example stop window (OffWindowSize) value is 5. It is noted that this value may be adjusted based on weights assigned to the communication session between client 102 and application server 106. An example start window (OnWindowSize) value is 2. In accordance with some implementations, the stop window value and the start window value are different in order to prevent a situation where transmission rapidly toggles back and forth between ON and OFF.

In accordance with yet other implementations, the start and stop window values can be dynamically adjusted based on, e.g., historical performance of the client 102, a type of network being used (e.g., Ethernet vs. cellular data), etc. The difference between the start window value and stop window value may be made bigger as transmissions between the application server 106 and client 102 are successful and made smaller where there is trouble in the transmissions.

Thus, as described above, the application server 106 makes all flow control decisions based on information received from the client 102. Further, the process 200 prevents delays in informing in the application server 106 that there is a delay at the client 102. This allows the message flow to adapt to quality/performance of the client 102. For example, even if the client 102 slows down and cannot process messages quickly enough, the flow control mechanism of FIG. 2 will stop the transmission of messages, even though the network is fully capable of sending messages.

In accordance with the above, the operational flow of FIG. 2 may also be used to account for transmission characteristics of the communication connection 126. For example, the communication connection 126 may not provide the high bandwidth of an internal system bus of a computing device. Therefore, the operational flow 200 address latency that may occur during communication between the application server 106 and the remote access server 104.

Accordance with the other implementations, the operational flow 200 may provide for interoperability among services and/or clients that do not recognize or send an SSI and/or CSI. For example, if the application server 106 does not send SSI, the client 102, may be adapted such that it does not does not send a CSI. Also, if the service sends an SSI, but client 102, does not respond with CSI, then the service will assume that the client is not enabled.

In some implementations, two or more client devices may collaboratively interact in a collaborative session with the service using the remote access server 104. The remote access server 104 may utilize a state model to present a synchronized view of display data associated with the application server 106. Flow control may be implemented on a per-client basis. Where transmission is OFF to a particular client, that client may skip messages to re-synchronize its view with other clients in the collaborative session when transmission returns to an ON state.

Figure 3:
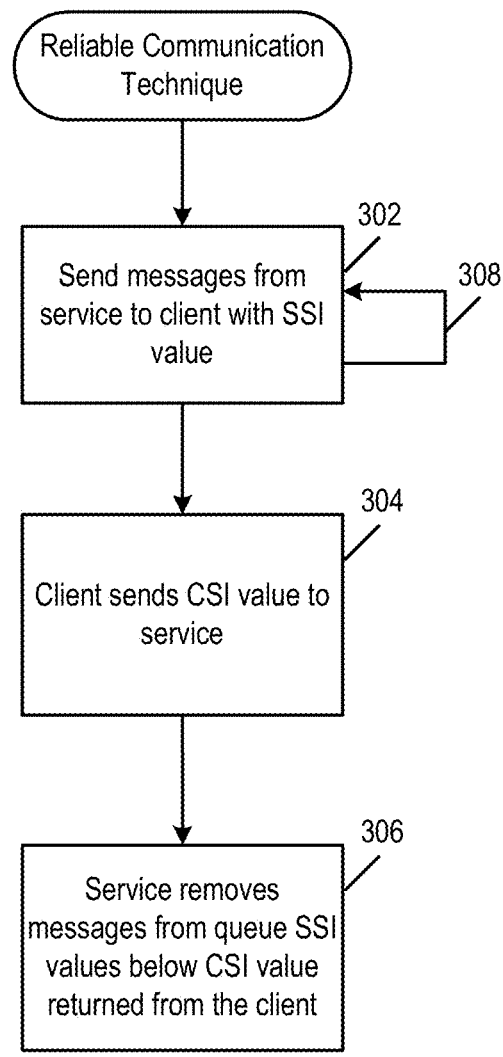
FIG. 3 illustrates a flow diagram of example operations performed within the architecture of FIG. 1.

FIG. 3 illustrates an operational flow diagram 300 of providing reliable messaging associated between a service and a logically connected client utilizing the SSI and CSI. For example, in some implementations, the CSI responses from the client may be used so that the application server 106 knows what messages have been successfully received by the client 102. At 302, the service sends a message to the client with the SSI. Next, at 302, the client sends a message to the service with the CSI value. If the application server 106 receives this message, then at 306, the application server 106 can safely remove the message associated with the associated SSI value from the service send queue 130. However, in instances where the CSI is not received, the service may resend the message with the corresponding SSI (308). Similarly, the process 302-308 may be used at the client. For example, every time the application server 106 sends a message to the client 102, the received SSI value may be used to safely remove the messages associated with the previous SSI value from the client send queue 122. Thus, the SSI and CSI values may be used to provide reliable communications between the application server 106 and the client 102.

Figure 4A:
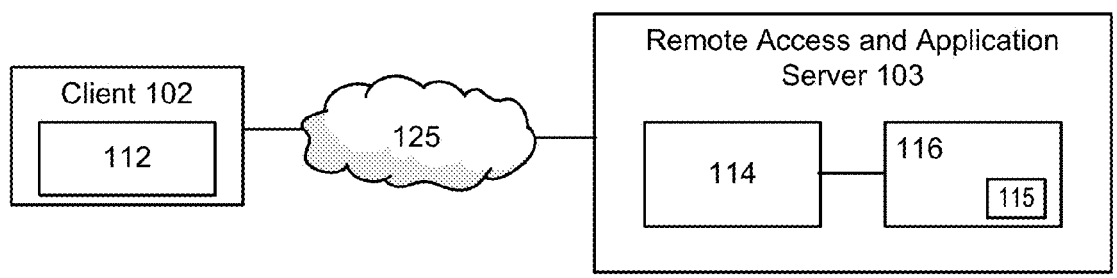
FIGS. 4A and 4B, illustrate example server-service models for client remote access to services in a layered architecture, such as shown in FIG. 1.
Figure 4B:
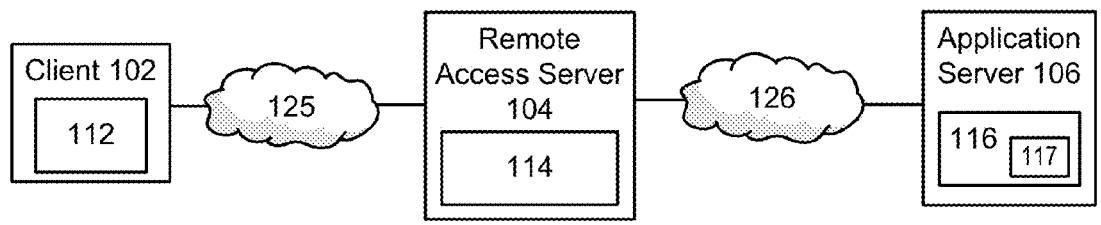

Reference is now made to FIGS. 4A and 4B, which illustrate examples of alternative models for client remote access to services in a layered architecture, such as that shown in FIG. 1 in which the client-side flow mechanism described above may be implemented. FIG. 4A illustrates a "managed service" 115 in which the services are deployed on the same system node or computing device as the remote access and application server to which client devices communicate. In this case, the service is managed in that the server controls the application/process life cycle by starting and stopping the service as client connect and disconnect. FIG. 4B illustrates an "unmanaged service" 117 in which services are deployed on servers at a different system node from the integrated remote access and application server the application/process life cycle is no longer managed by the remote access server.

In both FIGS. 4A and 4B, the server remote access program may provide for connection marshalling and application process management. Further both the managed service 115 and unmanaged service 117 may implement the client-side flow control of FIG. 2 and/or reliable messaging of FIG. 3. For example, in the environment of FIG. 4B is implemented, if the communication connection 126 experiences conditions that cause communication problems between the unmanaged service 117 and the remote access server 104, the tracking of the SSI and CSI values by the flow control mechanism of FIG. 2 may be used by the unmanaged service 117 turn off communications until the conditions are more favorable.

As shown in FIG. 4A, the client 102 has the client layer 112 that may communicate to a remote access and application server 103 that includes the server layer 114 and the service layer 116. The client 102 may be connected by a communication network 125 to the remote access and application server 103. The remote access and application server 103 may include a server remote access program that executes in the server layer 114. The server remote access program is used to connect the client 102 to a managed service 115 (e.g., an application) executing in the service layer 116. Within the remote access and application server 103, the server remote access program in the server layer 114 may be connected to the service in the service layer 116 using a TCP socket connection and by, e.g., a system bus of the remote access and application server 103. Thus, bandwidth between the server remote access program and the service is extremely high. An example of the client 102 and the remote access and application server 103 is shown in FIG. 5.

Referring now to FIG. 4B, there is illustrated an example of an unmanaged service deployment. In such environments, a remote access server 104 includes the server layer 114 in which the server remote access program executes. An application server 106 includes the service layer 116 in which the service or application executes. In the environment of FIG. 4B, the service (shown as unmanaged service 117) is provided on a computing device other than a computing device on which the server remote access program executes and communicates over the communication connection 126 to the remote access server 104. Thus, the service is on a node separate from the server. An example of the remote access server 104 and the application server 106 is shown in FIG. 5.

In FIG. 4B, the client 102 connects to the remote access server 104 over communication connection 125. The application server 106 may connect to the remote access server 104 at a predetermined Internet Protocol (IP) address and/or socket, or using a Uniform Resource Locator (URL) associated with the remote access server 104 to register the service or application with the server remote access program executing on the remote access server 104. An external entity (the end user, or another process or application) launches the unmanaged service 117 outside of the remote access server 104. The unmanaged service 117, on startup, connects to the remote access server 104 using a server-service socket connection and establishes the session as a queued and unmanaged application to which a client may connect.

Figure 5:
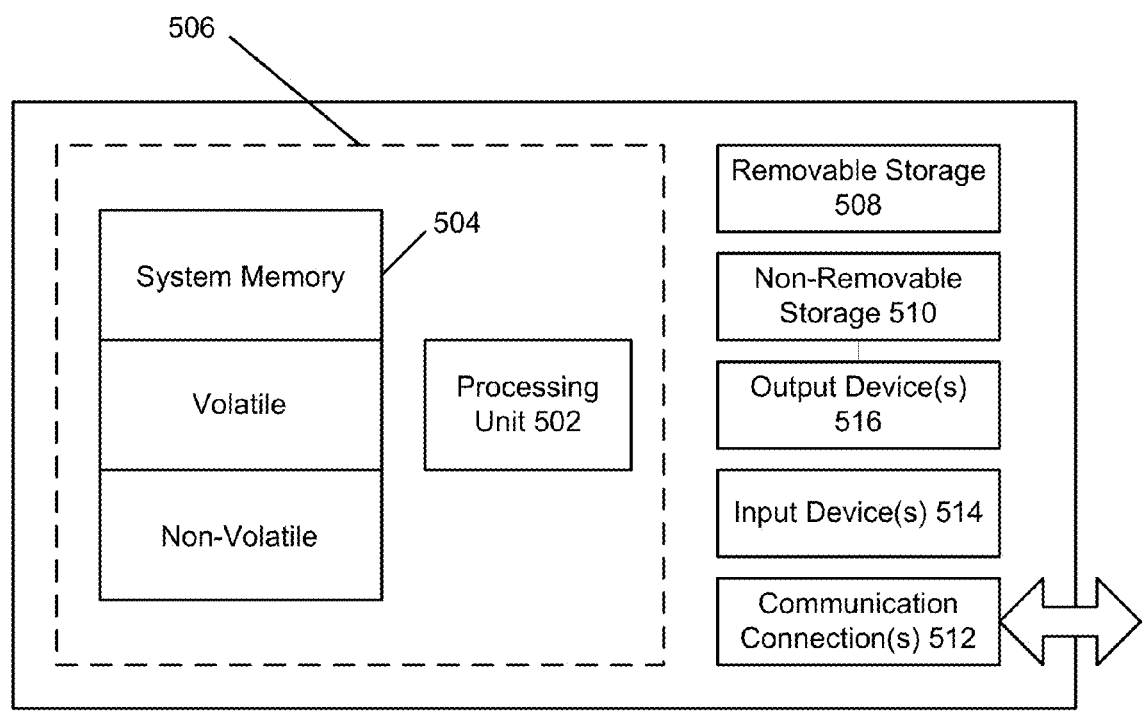
FIG. 5 illustrates an exemplary computing device.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of tangible computer readable media. Computer readable media can be any available tangible media that can be accessed by device 500 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing client-side flow control in a remote access system, comprising:
    communicating messages from a service to a client, the service being remotely accessed by the client and the messages including a service sequence ID (SSI);
    receiving, at the service, a client sequence ID (CSI) from the client in response to the client completing processing of a message having a specific SSI associated with the message;
    determining, at the service, a difference between a current SSI communicated to the client and the current CSI received from the client; and
    if the difference is greater than a predetermined stop window value, turning communication from the service to the client OFF.

2. The method of claim 1, further comprising:
    subsequently determining, at the service, a difference between the current SSI and a subsequent CSI received from the client; and
    if the difference is less than a predetermined start window value, turning communication from the service to the client ON.

3. The method of claim 2, wherein the predetermined start window value is less than the predetermined stop window value.

4. The method of claim 2, further comprising dynamically adjusting the start window value or the stop window value in accordance with one of network conditions and a processing capacity of the client.

5. The method of claim 1, further comprising maintaining the current SSI and CSI values at the service to perform the determining.

6. The method of claim 1, further comprising:
    providing a client layer at the client;
    providing a service layer associated with the service, the service layer having a service receive queue for messages received from the client and a service send queue of messages destined for the client; and
    providing a server layer as a communications proxy for messages sent between the client and the service, the server layer containing an outbound client queue of messages destined for the client.

7. The method of claim 6, further comprising queue messages in the service send queue when the communication from the service to the client is OFF.

8. The method of claim 7, further comprising performing the determining in a service layer SDK provided in the service layer.

9. The method of claim 6, further comprising:
    detecting a failure of communication between the client and the service by determining that a message have a particular SSI was not acknowledged by the client; and
    upon detecting the failure, resending the message having the particular SSI.

10. The method of claim 6, further comprising resending the message from the service send queue.

11. The method of claim 1, further comprising:
    detecting a failure of communication between the client and the service using the SSI; and
    upon detecting the failure, resending a message having a particular SSI determined to have been unacknowledged by the client.

12. The method of claim 1, further comprising:
    providing the service as an unmanaged service executing on an application server;
    providing a server remote access program executing on a remote access server that communicates with the service over a first communication connection and with the client over a second communication connection;
    receiving a connection from the client at the remote access server over the second communication connection; and
    communicating messages from the service to the client in accordance with the determining.

13. The method of claim 12, further comprising providing the application server and the remote access server as different nodes.

14. A method of providing client-side flow control, comprising:
    communicating a message from a service to a client, the message including a tracking mechanism that is incremented by the service to represent a relative position of the message within a plurality of messages that are communicated from the service to the client;
    receiving, at the service, a response from the client indicating a completion of processing of a message according to the tracking mechanism;
    determining, at the service from the response, if the processing of messages at the client is lagging beyond a first predetermined value and
    turning communication from the service to the client OFF if the client is lagging beyond the predetermined value.

15. The method of claim 14, further comprising:
    receiving a subsequent response at the service; and
    determining, at the service from the subsequent response, if the processing of messages at the client is no longer lagging beyond a second predetermined value; and
    turning communication from the service to the client ON.

16. The method of claim 15, wherein the second predetermined value is less than the first predetermined value.

17. The method of claim 15, further comprising dynamically adjusting the first predetermined value or the second predetermined value in accordance with one of network conditions and a processing capacity of the client.

18. An apparatus for providing client-side flow control of communication of messages from a service to a client, comprising:
- a remote access server having a server layer as a communications proxy for messages sent between the client and the service, the server layer containing an outbound client queue of messages destined for the client;
- a second server executing a service layer associated with the service, the service layer having a service receive queue for messages received from the client and a service send queue of messages destined for the client,
- wherein the messages destined for the client include a service sequence ID (SSI) and the messages received from the client include a client sequence ID (CSI) indicative of the client completing processing of a message having a specific SSI associated with the message, and
- wherein the service determines if a difference between a current SSI and the CSI received from the client is greater than a predetermined stop window value to turn communication from the service to the client OFF.

19. The apparatus of claim 18, wherein the service further determines if a difference between the current SSI and the CSI is less than a predetermined start window value to turn communication from the service to the client ON.

20. The apparatus of claim 19, wherein the predetermined start window value is less than the predetermined stop window value.

21. The apparatus of claim 19, wherein the start window value or the stop window value is dynamically adjusted in accordance with one of network conditions and a processing capacity of the client.

22. The apparatus of claim 18, wherein messages are queued at in service send queue when the communication from the service to the client is OFF.

* * * * *